July 3, 1923.
E. RAMONDO
SPRING WHEEL
Filed Nov. 13, 1922    2 Sheets-Sheet 1
1,460,920
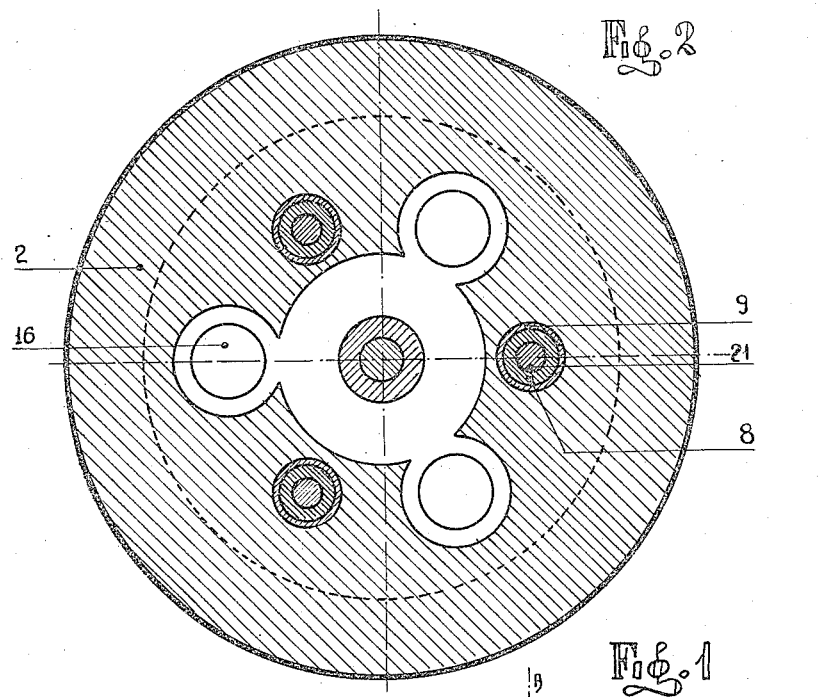
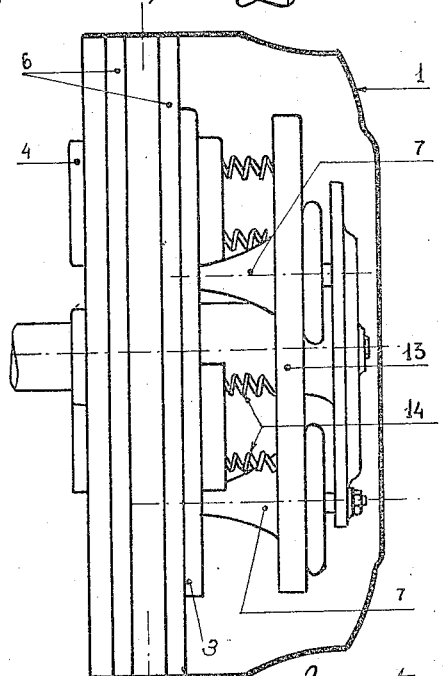
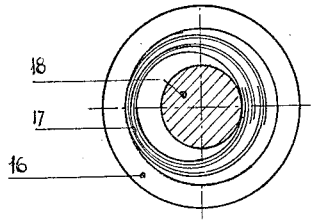

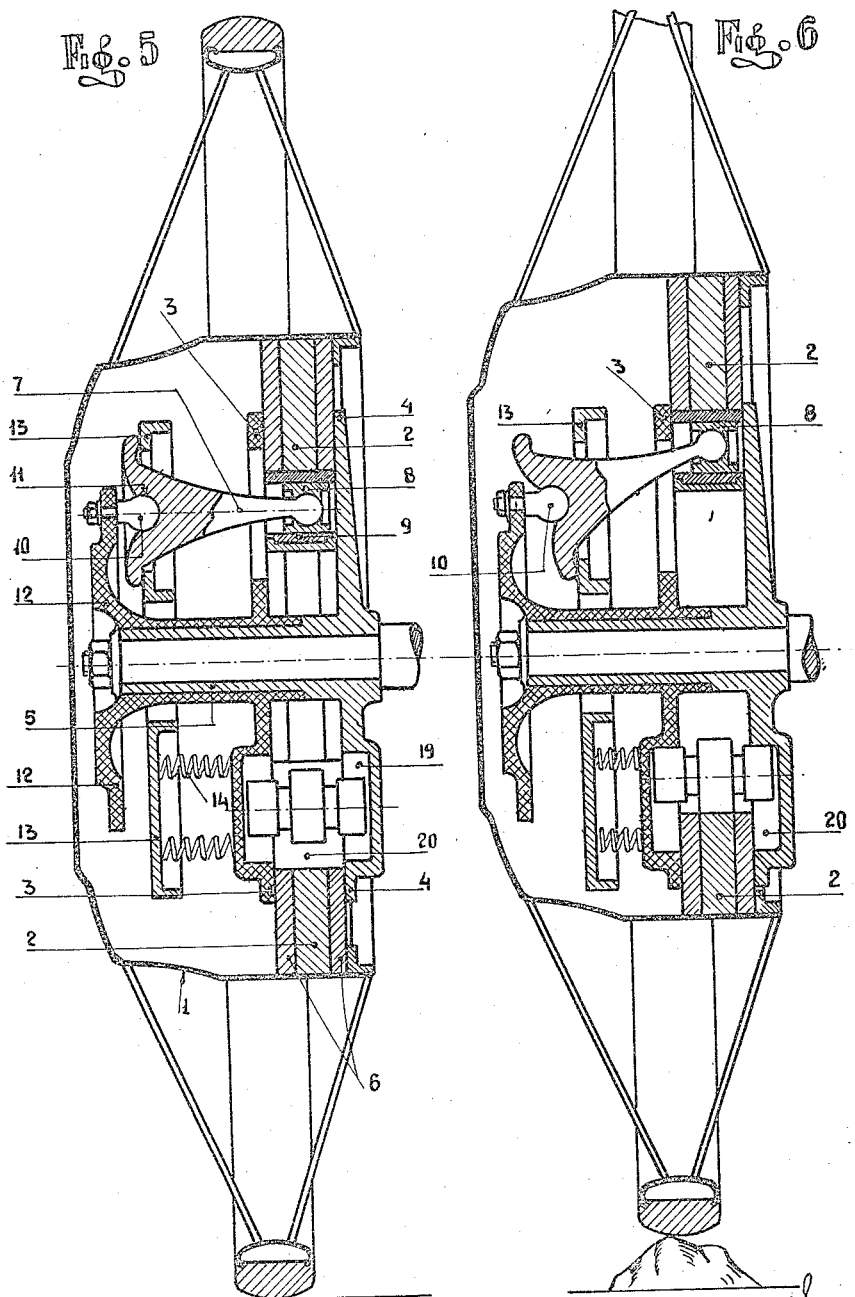

Patented July 3, 1923.

1,460,920

UNITED STATES PATENT OFFICE.

EDOARDO RAMONDO, OF TURIN, ITALY.

SPRING WHEEL.

Application filed November 13, 1922. Serial No. 600,663.

*To all whom it may concern:*

Be it known that I, EDOARDO RAMONDO, a subject of the King of Italy, residing at Madonna del Pilone, Turin, in the Kingdom of Italy, have invented certain new and useful Improvements in Spring Wheels; and I do hereby declare the following to be a full, clear, and exact description of the invention, such as will enable others skilled in the art to which it appertains to make and use the same, reference being had to the accompanying drawings and to letters or figures of reference marked thereon, which form a part of this specification.

This invention relates to a spring wheel, the body whereof is capable of radial and angular displacement with respect to the hub, while the parts always lie in the same plane.

The spring system consists of a number of elastic or resilient bodies working simultaneously and under a uniform load parallel to the axis of the hub and always in the same direction, at any radial or angular displacement of the wheel relatively to the hub.

This adjustment of the forces is obtained through a system of bell crank levers having a special form, the fulcrum whereof is articulated to a flange on the hub, one of the arms being jointed to the movable part of the wheel secured to the spider, while the other acts upon a flange sliding axially of the hub, so that each movement of the bell crank brings about an axial displacement between the flange and hub, a number of springs taking up the stress being interposed between the hub flange and the slidable flange.

In order to prevent an abnormal stress on the fulcrum of the bell crank levers an auxiliary shock absorbing system is provided for the oscillations exceeding a determined value, and consisting of elastic or resilient means interposed between the movable and the fixed part. Said shock absorbers comprise a series of rollers connected by elastic contractile pins lodged on seats provided partly on the fixed and partly on the movable part.

The accompanying drawing shows diagrammatically a constructional form of this invention.

Fig. 1 is an edge view of the hub with the casing in section;

Fig. 2 is a section on line A—B of Figure 1;

Figs. 3 and 4 show details of the elastic means for damping the angular oscillations;

Fig. 5 is an axial cross section of the spring wheel at rest;

Fig. 6 is a section similar to that of Figure 5, showing the position of the spring members under the action of shocks.

1 (Figure 1) denotes an auxiliary hub, forming the centre of the wheel spider secured to a metallic disc 2, free to be eccentrically displaced between two flanges 3—4 secured to the hub 5. The disc 2 is conveniently faced with fibre discs 6 serving as cushions between the surfaces.

The main spring device consists of three cones 7 having their vertex pivoted to bearings 8 slidable on the three bushes 9 fixed at equal intervals to the disc 2. The centre of the base 10 of the cone is pivoted to balls 11 which are coaxial (at rest) with the bushes 9 and secured to the flange 12 of the hub 5. The base of the cone rests with its edge on a slidable ring flange 13 which is under the action of springs 14 acting between same and the flange 3. It is clear that in the normal position of the wheel the axis of the cones are perfectly parallel with the axis of the wheel and their bases lie exactly in the same plane, so that their edges contact all over with the ring flange 13, and the pressure of this latter is uniformly distributed on the balls 11 which act as thrust pins.

When the disc 2 becomes eccentric with respect to the hub, the axis of the cones are inclined and their bases no longer lie on the same plane. There is always, however, a point of contact between the ring flange 13 and the edge of each cone, and, as the flange is constantly displaced on the same side during the movement of the cones, it will act upon these three contact points by the pressure of its springs tending to restore the cones and therefore the wheel to their normal position.

It is clear that at any displacement of the disc 2 (that is to say of the wheel) relatively to the hub, the cones are inclined and the ring flange 13 is displaced, increasing the elastic or resilient reaction. When the cones are inclined all through the same angle and on the same side (under the action of a force tending to cause the wheel to become eccentric relatively to the hub by a mere radial displacement) as well as when the cones are inclined through different angles and on opposite sides (which happens when the force tends to revolve the wheel on the hub) a point of contact always exists between their bases and the ring flange 13 which, being displaced always in the same direction (whatever be the action of the cones) acts against the inclination of the cones by the reaction of springs 14 tending to restore the cones to their normal position.

An instantaneous force acting upon the wheel may be considered instantaneously applied to the vertex 21 of the cones (Figure 2), said force acts therefore orthogonally to the axis of revolution of the cones drawn across the centre 10 of their base and, as shown in the drawing, is not transmitted at all to the hub, on which the action of the force and the reaction of the resistance, being perfectly equal and apposite, are annulled.

This device acts as an elastic suspension means at the same time as an elastic transmission joint, because radial as well as angular displacements produce an identical action upon the springs 14.

The torsion stresses due to starting, braking, etc., result in loads on the springs 14 that are greater that those due to absorption of unevenness of the road, thus affecting the life of the elastic or resilient members.

This inconvenience is eliminated by interposing elastic means between the disc 2 and the flanges 4—3 which keep the displacements of the wheel between determined limits.

The said means consist of elastic or resilient rollers comprising two end rollers 15 and an intermediate roller 16 connected together by an elastic spindle formed by steel spring leaves 17 wound up in a spiral form, the right-handed and left-handed spirals being alternatively arranged one within the other, until a spindle of a suitable diameter is obtained, in which a safety pin or gudgeon 18 is loosely arranged.

The end rollers 15 are situated in a chamber 19 of the flanges 4—5, while the roller 16 is situated in the chamber 20 of a disc 2.

As shown in Figure 2, the said chambers are very large and allow a considerable radial and angular displacement between the disc 2 and the flanges 4—5 before the interaction of the rollers begins.

Beyond this limit the rollers act on their elastic spindle in the direction shown by the arrows (Figure 4) and the leaves subjected to this stress are subjected to a further winding up diminishing the diameter of the spindle and allowing a certain displacement of the rollers away from the axial line.

If the stress exerted on the rollers were to rise exceptionally above the safety load of the leaves 17, these would be prevented from any further contraction by the safety gudgeon or pin 18.

The elastic or resilient members disposed between the movable and the fixed part of the wheel, constituted by steel leaves in the example shown in the drawing, can be replaced by compound or air cushion springs suitably arranged as required by practical exigencies.

What I claim is:

1. A resilient wheel comprising a hub, a fixed abutment on the outer end thereof, an annular radially movable member surrounding the hub, supporting levers each having an enlarged end axially fulcrumed on the abutment and its other end mounted in and movable axially of the annular radially movable member, a universally movable member surrounding the hub and levers, and springs for holding the universally movable member in yielding contact with the enlarged ends of the levers.

2. A resilient wheel comprising a hub, guide flanges fixed thereon, a radially movable annular member mounted between the flanges, an abutment fixed on the outer end of the hub, supporting levers, each having a flanged end axially fulcrumed on the abutment and its other end mounted in and movable axially of the annular radially movable member, a universally movable annular member surrounding the hub and levers, and springs interposed between one of the guide flanges and the universally movable member to yieldingly hold the latter in contact with the flanges of the levers.

3. A resilient wheel comprising a hub, guide flanges fixed thereon, a radially movable annular member slidably mounted between the flanges, an abutment fixed on the outer end of the hub, a universally movable annular member between the abutment and flanges, spherical bearing members mounted on the abutment, cone-shaped supporting levers projecting through apertures formed in the universally movable member, each lever having its base portion axially mounted on a spherical bearing member and its vertex mounted in and movable axially of the radially movable annular member, and springs interposed between the guide flanges and the universally movable member to yieldingly hold the latter in contact with the levers.

4. A resilient wheel comprising a hub, a fixed abutment on the outer end thereof, an annular radially movable member surrounding the hub, supporting levers each having an enlarged end axially fulcrumed on the abutment and its other end mounted in and movable axially of the annular member, a universally movable member surrounding the hub and levers, springs for holding the universally movable members in yielding contact with the enlarged ends of the levers, and shock absorbers interposed between the hub and the inner periphery of the radially movable annular member.

5. A resilient wheel comprising a hub, guide flanges fixed thereon having recesses formed therein, a radially movable annular member slidably mounted between the flanges, cylindrical shock-absorbers mounted in the recesses between the hub and the inner periphery of the annular member, an abutment fixed on the outer end of the hub, spherical bearing members mounted on the abutment, a universally movable annular member surrounding the hub between the abutment and guide flanges, cone-shaped supporting levers projecting through apertures in the universally movable member, each lever having its base axially pivoted on a spherical bearing member and its vertex pivotally connected with and axially movable in the radially movable annular member, and spiral springs interposed between the guide flanges and universally movable member to hold the latter in contact with the enlarged ends of the levers.

In testimony that I claim the foregoing as my invention, I have signed my name.

EDOARDO RAMONDO.